United States Patent
Tang et al.

(10) Patent No.: US 10,798,777 B2
(45) Date of Patent: Oct. 6, 2020

(54) MULTI-DIMENSIONAL SEGMENTATION METHOD AND APPARATUS FOR 5G-ORIENTED PROTOCOL STACK, AND TERMINAL

(71) Applicant: HuiZhou TCL Mobile Communication Co., Ltd., HuiZhou (CN)

(72) Inventors: Yanbo Tang, HuiZhou (CN); Lin Tong, HuiZhou (CN); Jianliang Gu, HuiZhou (CN)

(73) Assignee: HuiZhou TCL Mobile Communication Co., Ltd., HuiZhou (CN)

(*) Notice: Subject to any disclaimer, the term of this patent is extended or adjusted under 35 U.S.C. 154(b) by 0 days.

(21) Appl. No.: 16/472,885

(22) PCT Filed: Dec. 11, 2017

(86) PCT No.: PCT/CN2017/115404
§ 371 (c)(1),
(2) Date: Jun. 23, 2019

(87) PCT Pub. No.: WO2018/113546
PCT Pub. Date: Jun. 28, 2018

(65) Prior Publication Data
US 2020/0092942 A1    Mar. 19, 2020

(30) Foreign Application Priority Data
Dec. 22, 2016  (CN) ............ 2016 1 1198621

(51) Int. Cl.
*H04W 80/02* (2009.01)
*G06F 30/34* (2020.01)
(Continued)

(52) U.S. Cl.
CPC ............ *H04W 80/02* (2013.01); *G06F 30/34* (2020.01); *H04L 1/1812* (2013.01); *H04L 27/2607* (2013.01); *H04L 27/2636* (2013.01)

(58) Field of Classification Search
CPC ...... H04W 80/02; H04L 30/34; H04L 1/1812; H04L 27/2607; H04L 27/2636
See application file for complete search history.

(56) References Cited

U.S. PATENT DOCUMENTS

| 10,298,453 B2 | 5/2019 | Guo et al. |
| 2002/0015401 A1 | 2/2002 | Subramanian et al. |

(Continued)

FOREIGN PATENT DOCUMENTS

| CN | 102438338 | 5/2012 |
| CN | 104053174 | 9/2014 |

(Continued)

*Primary Examiner* — Brenda H Pham (57) ABSTRACT

Disclosed are a multi-dimensional segmentation method and apparatus for a 5G-oriented protocol stack, and a terminal. The method comprises: segmenting an MAC layer in a protocol stack, and putting HARQ entities of a physical layer and the MAC layer together in a pre-set physical resource for processing; and moving a relevant partial module of the physical layer to an FPGA for processing according to a calculation amount and functional requirements. The hardware configuration requirements are reduced on the basis of guaranteeing the performance.

20 Claims, 3 Drawing Sheets

(51) Int. Cl.
  *H04L 1/18*    (2006.01)
  *H04L 27/26*   (2006.01)

(56) References Cited

U.S. PATENT DOCUMENTS

2002/0174251 A1* 11/2002 Lasserre ............ H04L 12/4633
                                                     709/249
2017/0118075 A1   4/2017 Guo et al.

FOREIGN PATENT DOCUMENTS

| CN | 105827654 | 8/2016 |
| CN | 106713314 | 5/2017 |
| WO | WO 2011/137783 | 11/2011 |

\* cited by examiner

MULTI-DIMENSIONAL SEGMENTATION METHOD AND APPARATUS FOR 5G-ORIENTED PROTOCOL STACK, AND TERMINAL

RELATED APPLICATIONS

This application is a National Phase of PCT Patent Application No. PCT/CN2017/115404 having International filing date of Dec. 11, 2017, which claims the benefit of priority of Chinese Patent Application No. 201611198621.0 filed on Dec. 22, 2016. The contents of the above applications are all incorporated by reference as if fully set forth herein in their entirety.

FIELD AND BACKGROUND OF THE INVENTION

The present disclosure relates to the field of protocol stack technology, more particularly, to a multi-dimensional segmentation method for a 5G protocol stack and a device and a terminal thereof.

In the 5G terminal platform design, the implementation of the protocol stack is a key factor. Currently, there are two methods used for implementing the functions of protocol stack.

First, the general purpose processor (GPP) platform basically runs the packet data convergence protocol (PDCP), the radio link control (RLC, which is a radio link control protocol in a radio communication system), the medium access control (MAC), and the physical layer (PHY) on the Intel's X86 platform. The overall consistency of code development is better, the development cycle is shorter, and the implementation is more convenient. However, there is no guarantee of real time and throughput. At the same time, the frame period for the 5G protocol stack becomes much shorter than that of the current long term evolution (LTE), and the time requirement of hybrid automatic repeat reQuest (HARQ) is also stricter. Therefore, it is very difficult for this method to satisfy the demands on the 5G platform.

Secondly, the physical layer code of the commercial LTE platform is basically achieved by a field-programmable gate array (FPGA) and digital signal processing (DSP). The performance is better. However, the development cost is high and development cycle is long, and the upgrade of a certain function requires more code to be updated.

Therefore, there is a need to provide a new method to implement the development of 5G protocol stack so as to resolve the above problems of the related art.

SUMMARY OF THE INVENTION

The present disclosure provides a multi-dimensional segmentation method for a 5G protocol stack and a device and a terminal thereof, which can solve the problems that the implementation of the protocol stack in the related art is difficult to meet the requirements of the 5G platform and the function upgrade requires more code to be updated.

According to a first aspect of the present disclosure, a terminal comprising a processor and a memory storing a plurality of instructions and data is provided. The processor executes the plurality of instructions to perform steps of:
  segmenting a MAC layer in a protocol stack, and placing a physical layer and an HARQ entity of the MAC layer into a predetermined physical resource for processing; and
  moving part of modules of the physical layer that are related to an FPGA for processing based on a calculation amount and a functional requirement.

Optionally, the step of segmenting the MAC layer in the protocol stack, and placing the physical layer and the HARQ entity of the MAC layer into the predetermined physical resource for processing further comprises:
  segmenting the MAC layer in the protocol stack to separate the HARQ entity of the MAC layer; and
  implementing the HARQ entity of the MAC layer that is separated and the physical layer in a carrier module entity, placing the physical layer and the HARQ entity of the MAC layer together into the predetermined physical resource for processing.

Optionally, an interface of the segmented MAC layer is a G-bit Ethernet port.

Optionally, the carrier module entity comprises a GPP board and a radio frequency board, the radio frequency board integrates the FPGA, an interface between the radio frequency board and the GPP board is a PCIe interface or an SRIO interface.

Optionally, the step of moving part of the modules of the physical layer that are related to the FPGA for processing based on the calculation amount and the functional requirement comprises:
  moving part of the modules in the physical layer that have a calculation amount greater than a predetermined value to the radio frequency board with the FPGA.

Optionally, the part of the modules that have the calculation amount greater than the predetermined value comprises an FFT module/IFFT module and an addition and subtraction cyclic prefix module in the GPP board.

Optionally, the step of moving part of the modules of the physical layer that are related to the FPGA for processing based on the calculation amount and the functional requirement comprises:
  moving modules for performing precoding of a data channel in the physical layer to the radio frequency board with the FPGA.

Optionally, the step of moving part of the modules of the physical layer that are related to the FPGA for processing based on the calculation amount and the functional requirement comprises:
  moving modules related to FFT and Turbe codec to the FPGA for processing.

According to a second aspect of the present disclosure, a multi-dimensional segmentation method for a 5G protocol stack comprises:
  segmenting a MAC layer in a protocol stack, and placing a physical layer and an HARQ entity of the MAC layer into a predetermined physical resource for processing; and
  moving part of modules of the physical layer that are related to an FPGA for processing based on a calculation amount and a functional requirement.

Optionally, the step of segmenting the MAC layer in the protocol stack, and placing the physical layer and the HARQ entity of the MAC layer into the predetermined physical resource for processing further comprises:
  segmenting the MAC layer in the protocol stack to separate the HARQ entity of the MAC layer; and
  implementing the HARQ entity of the MAC layer that is separated and the physical layer in a carrier module entity, placing the physical layer and the HARQ entity of the MAC layer together into the predetermined physical resource for processing.

Optionally, an interface of the segmented MAC layer is a G-bit Ethernet port.

Optionally, the carrier module entity comprises a GPP board and a radio frequency board, the radio frequency board integrates the FPGA, an interface between the radio frequency board and the GPP board is a PCIe interface or an SRIO interface.

Optionally, the step of moving part of the modules of the physical layer that are related to the FPGA for processing based on the calculation amount and the functional requirement comprises:
moving part of the modules in the physical layer that have a calculation amount greater than a predetermined value to the radio frequency board with the FPGA.

Optionally, the part of the modules that have the calculation amount greater than the predetermined value comprises an FFT module/IFFT module and an addition and subtraction cyclic prefix module in the GPP board.

Optionally, the step of moving part of the modules of the physical layer that are related to the FPGA for processing based on the calculation amount and the functional requirement comprises:
moving modules for performing precoding of a data channel in the physical layer to the radio frequency board with the FPGA.

Optionally, the step of moving part of the modules of the physical layer that are related to the FPGA for processing based on the calculation amount and the functional requirement comprises:
moving modules related to FFT and Turbe codec to the FPGA for processing.

According to a third aspect of the present disclosure, a multi-dimensional segmentation device for a protocol stack for implementing the multi-dimensional segmentation method for the 5G protocol stack comprises:
one or more processors;
a memory; and
one or more applications, wherein the one or more applications are stored in the memory, and are configured to be executed by the one or more processors, the one or more applications comprise:
a segmentation module and a moving module;
the segmentation module segmenting the MAC layer in the protocol stack, and placing the physical layer and the HARQ entity of the MAC layer together into the predetermined physical resource for processing; the moving module moving part of the modules of the physical layer that are related to the FPGA for processing based on the calculation amount and the functional requirement.

Optionally, the segmentation module is configured to segment the MAC layer in the protocol stack to separate the HARQ entity of the MAC layer, implement the HARQ entity of the MAC layer that is separated and the physical layer in a carrier module entity, place the physical layer and the HARQ entity of the MAC layer together into the predetermined physical resource for processing.

Optionally, the moving module is configured to move part of the modules in the physical layer that have a calculation amount greater than a predetermined value to the radio frequency board with the FPGA.

Optionally, the moving module is configured to move the modules for performing precoding of a data channel in the physical layer to the radio frequency board with the FPGA.

As compared to the related art, the present disclosure provides a multi-dimensional segmentation method for a 5G protocol stack and a device thereof. The multi-dimensional segmentation method for the 5G protocol stack comprises: step A: segmenting a MAC layer in a protocol stack, and placing a physical layer and an HARQ entity of the MAC layer into a predetermined physical resource for processing; and step B: moving part of modules of the physical layer that are related to an FPGA for processing based on a calculation amount and a functional requirement. The multi-dimensional segmentation is used to reasonably utilize the physical resources, and at the same time, the positions of modules can be flexibly configured and dispatched within a small dimensional range. Processing in the FPGA can meet the time requirement of the HARQ on the 5G platform, and facilitate the code debugging during the function upgrade, thus solving the problems that the implementation of the protocol stack in the related art is difficult to meet the requirements of the 5G platform and the function upgrade requires more code to be updated. On the basis of ensuring performances, the requirements for hardware configuration are reduced.

DESCRIPTION OF SPECIFIC EMBODIMENTS OF THE INVENTION

The present disclosure provides a multi-dimensional segmentation method for a 5G protocol stack and a device and a terminal thereof. The multi-dimensional segmentation is used to reasonably utilize the physical resources, and at the same time, the positions of modules can be flexibly configured and dispatched within a small dimensional range, and the hardware configuration requirements are reduced on the basis of guaranteed performance. The present disclosure will be further described in detail below with reference to the accompanying drawings and embodiments. It is understood that the specific embodiments described herein are merely illustrative of the present disclosure and are not intended to limit the present disclosure.

Figure 1:
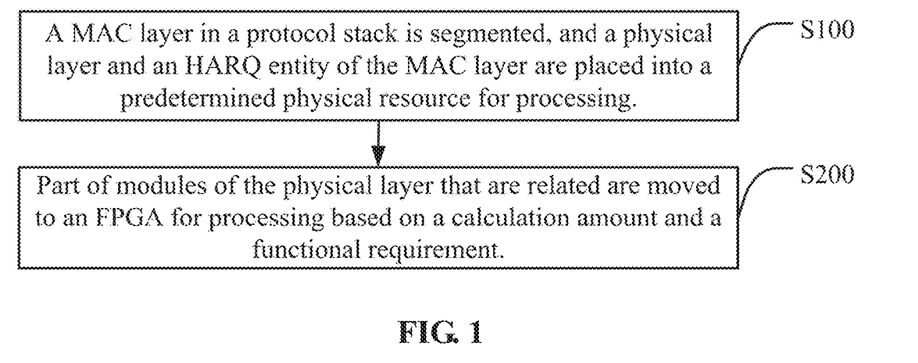
FIG. 1 is a flowchart of a multi-dimensional segmentation method for a 5G protocol stack according to one embodiment of the present disclosure.
Figure 2:
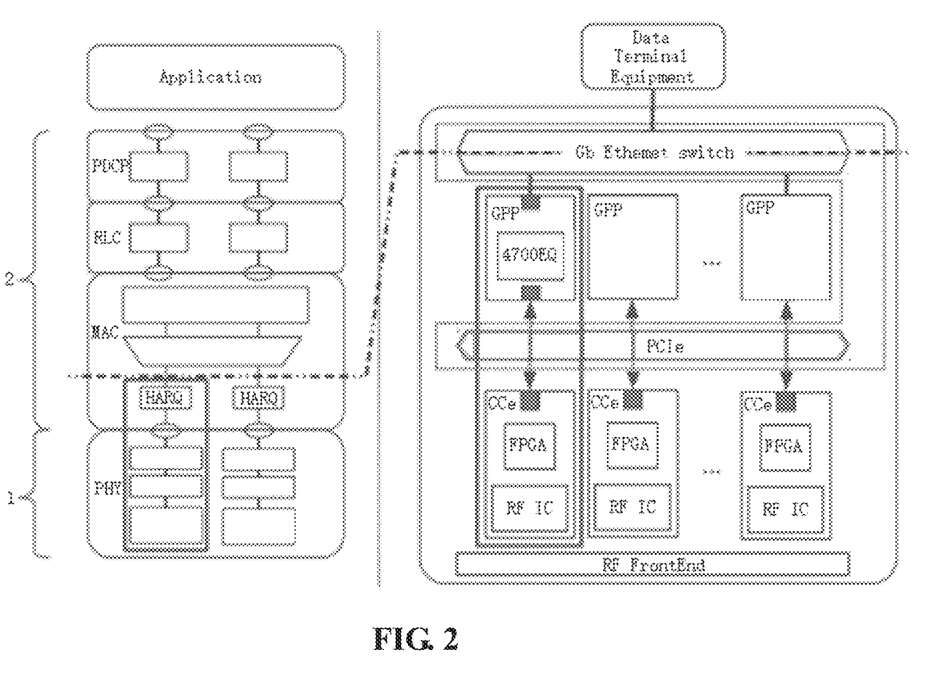
FIG. 2 is a schematic diagram of various layers of a multi-dimensional segmentation method for a 5G protocol stack according to one embodiment of the present disclosure.

A description is provided with reference to FIG. 1 and FIG. 2. The multi-dimensional segmentation method for the 5G protocol stack according to the present disclosure comprises:

S100: A MAC layer in a protocol stack is segmented, and a physical layer and an HARQ entity of the MAC layer are placed into a predetermined physical resource for processing.

S200: Part of modules of the physical layer that are related are moved to an FPGA for processing based on a calculation amount and a functional requirement.

As shown in FIG. 2, an Application runs in the LTE protocol stack. The protocol stack comprises a layer 1, a layer 2, and a layer 3. The layer 2 comprises three sub-layers, that is, PDCP, RLC, and MAC. Based on PDCP and RLC, the modules of the non-HARQ entity in the MAC have lower hardware resource requirements than the physical layer. The processing method of segmenting the MAC of the protocol stack has a small impact on delay. In the present embodiment, the MAC layer is segmented to separate the HARQ entity of the MAC layer, and the HARQ entity of the MAC layer that is separated and the physical layer are implemented in a carrier module entity (CCe). The physical layer and the HARQ entity of the MAC layer are placed together into a predetermined physical resource (such as FPGA or DSP) for processing. The physical layer has high hardware requirements and needs real-time processing, while the layer 2 and the layer 3 have lower hardware requirements. The advantage of this segmentation lies in the application layer. In consideration of the subsequent support for C-RAN (a clean system based on centralized processing, collaborative radio and real-time cloud infrastructure) and cloud computing, the modules of different base stations can be aggregated and implemented together with the base layer in a certain server entity. For the UE (user equipment), the computing resources of the mobile phone processor can be reduced.

The dotted line in FIG. 2 represents the segmentation line, and the dotted line on the left indicates from which node the segmentation takes place. The newly formed module (represented by the box) after segmentation comprises the HARQ entity of the MAC layer and the entire modules of the physical layer, which is called CCe. The block diagram on the right shows the internal structure of CCe. An interface of the segmented MAC layer is a G-bit Ethernet port, as shown in FIG. 2. Therefore, the data terminal equipment is connected to the CCe through a Gb Ethernet switch. One CCe comprises two boards. One is a baseband processing board. This board adopts the GPP mode and can be called a GPP board. In greater detail, the Intel 4700EQ processor can be adopted as shown in the figure. The other board is essentially a radio frequency module (that is, an RF board, connected to the RF front end). However, this RF board integrates a high-performance FPGA, and here Xilinx V7 is used. An interface between the RF board and the GPP board is a PCIe interface or an SRIO (Serial Rapid IO) interface, which can ensure the high-speed data transmission requirements of each module in the physical layer segmentation. The RF IC in FIG. 2 is a radio frequency chip.

It should be understood that, in the present embodiment, a multi-dimensional and hierarchical method for performing protocol stack segmentation is provided, and which specific node the segmentation takes place at may be changed depending on practical needs. That is, the modules having higher hardware resource requirements are combined. For example, in the present embodiment, the segmentation is performed at the MAC layer, however, the segmentation may also be performed at the physical layer (PHY).

Figure 3:
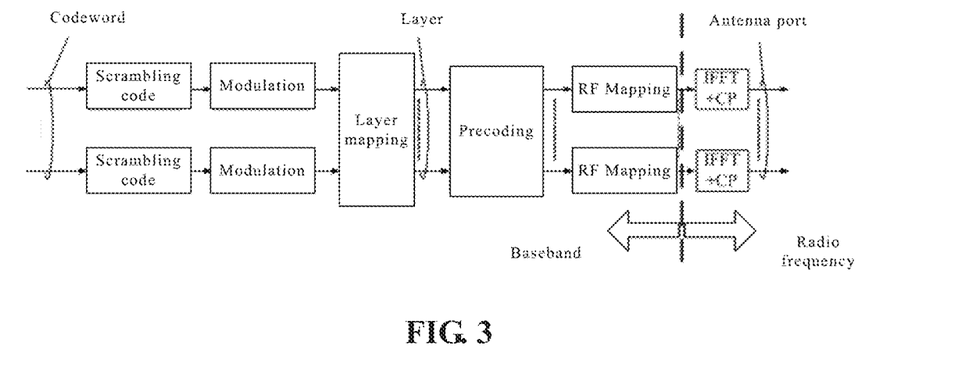
FIG. 3 is a schematic diagram of moving part of modules of a physical layer that are related to an FPGA according to one embodiment of the present disclosure.

In the hierarchical segmentation method, that is, in step S200, in a same CCe, which part of the modules of the physical layer are moved to the FPGA is determined by comprehensively considering the processing capability of the GPP card, performance requirements for a certain feature, the processing capability of the FPGA module, and the difficulty of implementing the interface. As shown in FIG. 3, the high-dimensional segmentation is determined based on the computing resource distribution of the platform. That is, part of modules that have a calculation amount greater than a predetermined value are moved to the RF board with the FPGA. For example, an FFT (Fast Fourier Transform) module/IFFT (Inverse Fast Fourier Transform) module and an addition and subtraction cyclic prefix module (+CP), which are originally implemented in the GPP module and have a greater calculation amount, are transferred to the FPGA for execution. Transmission of frequency data in PCIe will lower the data rate. In addition, the FPGA-optimized IP library has great advantages for the processing of FFT module, IFFT module, and Turbe codec module, etc. In one embodiment, modules related to FFT and Turbe codec may further be moved to the FPGA for processing.

Figure 4:
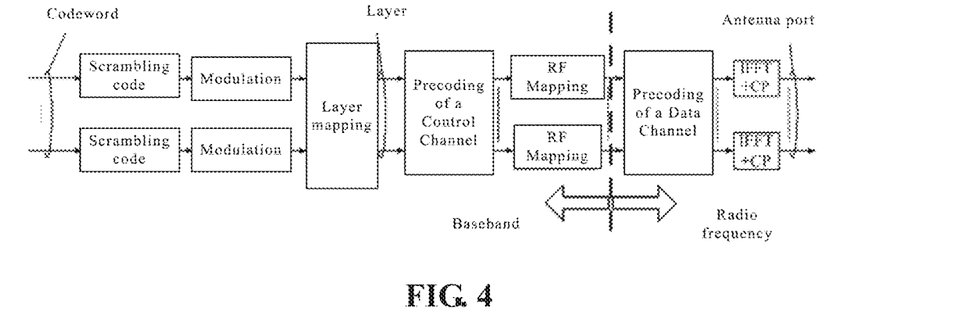
FIG. 4 is a schematic diagram of moving part of modules of a physical layer that are related to an FPGA according to another embodiment of the present disclosure.

The low-dimensional segmentation takes into account the hardware requirements and various functions to flexibly deploy different modules so as to flexibly adjust and segment the modules of the physical layer. As shown in FIG. 4, in the development of functions for 5G, there are often some new functions that need to be pre-verified. These verifications require multiple tries, and optimization of parameters, such as for algorithms and delays, is critical. For example, in some algorithms where the control data is separated, precoding of a control channel requires less resources, but precoding of a data channel requires a large amount of computation. In the present embodiment, modules for performing the precoding of the data channel are moved to the FPGA. Since the computing processing capability of the FPGA is very powerful, the precoding of the data channel can be completely processed in parallel, thus reducing the requirement for hardware configuration.

Not every module in the physical layer can be moved to the FPGA for processing. It is necessary to consider the requirements of delay and the processing time defined by the protocol such as HARQ. In one embodiment, a physical layer model can be established in the early stage of the segmentation. After the simulation analysis of the physical layer model, the approximate segmentation direction and feasibility are obtained. The basic principle is to meet the 3GPP requirements for delay and HARQ.

Furthermore, in one embodiment, some FPGA resources in the CCe may further be reserved for control of the RF module. Based on the addition of part of the modules of the physical layer that are related to the FPGA, the basic configuration process of the GPP module for the RF board after booting is:

Step 1: FPGA bitstream download is performed;
Step 2: Leon3 is started in the embedded ROM through 'pcie bootloader';
Step 3: The FPGA board is identified by the Linux operating system;
Step 4: The openair_rf.ko driver is started in the GPP board;
Step 5: The application is enabled in DDR3 by the driver and the application is started;
Step 6: A software is runned in the GPP board to define a radio program; in this step an interface between the FPGA and the GPP board is first established, and then configuration information is sent from the GPP board and configuration is started;
Step 7: Configuration of the transceiver is performed by the Leon 3 in the FPGA according to the configuration information sent by the GPP board.

Figure 5:
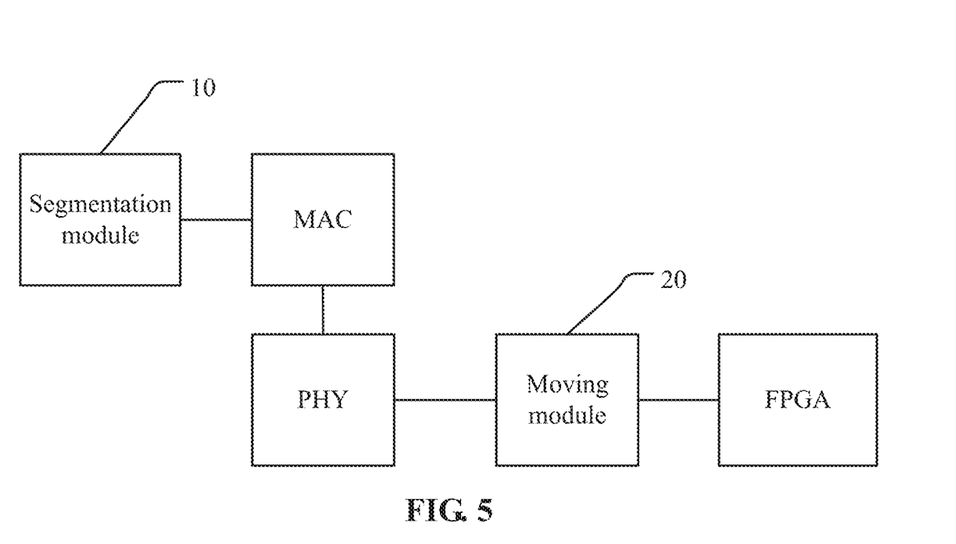
FIG. 5 is a schematic diagram of a multi-dimensional segmentation device for a 5G protocol stack according to one embodiment of the present disclosure.

Based on the above multi-dimensional segmentation method for the protocol stack, the present disclosure further provides a multi-dimensional segmentation device for a protocol stack. A description is provided with reference to FIG. 5. The multi-dimensional segmentation device for the protocol stack comprises a segmentation module 10 and a moving module 20. The segmentation module 10 segments a MAC layer in the protocol stack, and places a physical layer and an HARQ entity of the MAC layer together into a predetermined physical resource for processing. The moving module 20 moves part of modules of the physical layer that are related to an FPGA for processing according to a calculation amount and a functional requirement.

In summary, the multi-dimensional module segmentation mechanism according to the present disclosure utilizes multi-dimensional segmentation to reasonably utilize physical resources, and flexibly adjusts the positions of part of the modules of the physical layer to the FPGA for processing in a dynamical and small-scale manner depending on functions and requirements. Processing in the FPGA can meet the time requirement of the HARQ on the 5G platform, and facilitate the code debugging during the function upgrade, thus solving the problems that the implementation of the protocol stack in the related art is difficult to meet the requirements of the 5G platform and the function upgrade requires more code to be updated. On the basis of ensuring performances, the requirements for hardware configuration are reduced, and the implementation of the protocol stack for 5G is optimized.

One embodiment of the present disclosure further provides a storage medium storing a computer program. The computer program causes a computer to execute the above multi-dimensional segmentation method for the 5G protocol stack.

A person skilled in the art may understand that all or part of the steps in the various methods of the foregoing embodiments may be completed by a program to instruct related hardware. The program may be stored in a computer readable storage medium, and the storage medium may comprise: a ROM (Read Only Memory), a RAM (Random Access Memory), a magnetic disk, or an optical disc, etc.

Figure 6:
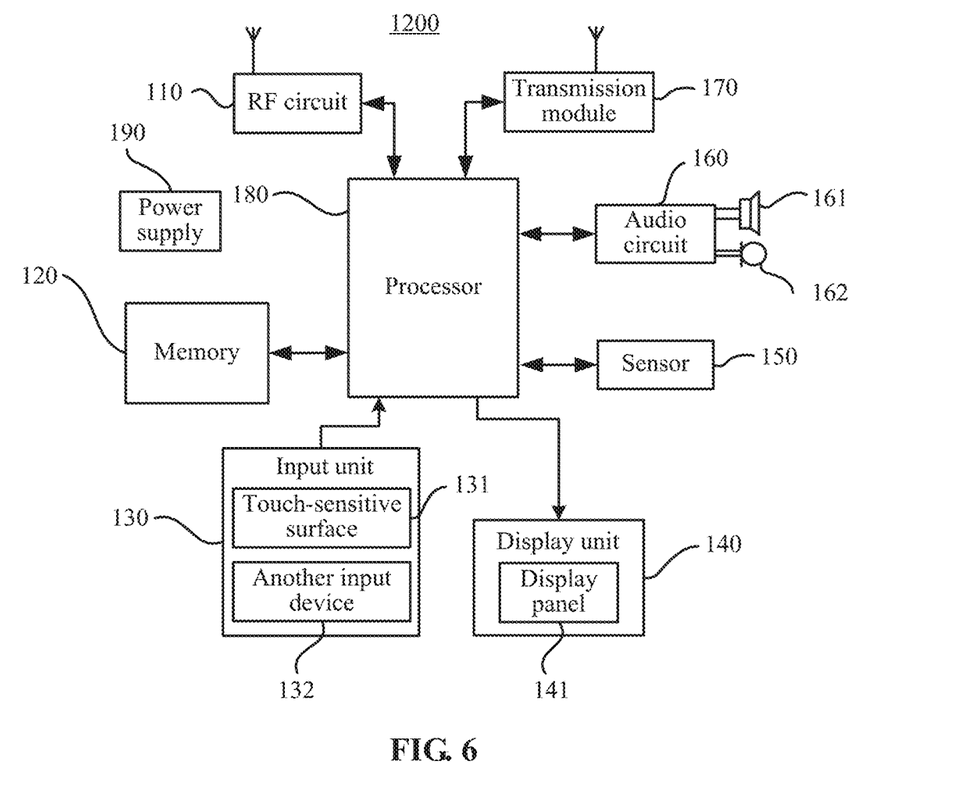
FIG. 6 is a structural schematic diagram of a terminal according to one embodiment of the present disclosure.

FIG. 6 shows a detailed block diagram of a terminal according to one embodiment of the present disclosure. The terminal may be used to implement the multi-dimensional segmentation method for the 5G protocol stack and the device thereof provided in the foregoing embodiments. The terminal 1200 may be a smartphone or a tablet.

As shown in FIG. 6, the terminal 1200 may comprise components, such as a radio frequency (RF) circuit 110, a memory 120 including one or more computer readable storage media, an input unit 130, a display unit 140, a sensor 150, an audio circuit 160, a transmission module 170, a processor 180 including one or more processing cores, and a power supply 190, etc. It will be understood by those skilled in the art that the terminal 1200 is not limited to the structure of the terminal 1200 shown in FIG. 6, and the terminal 1200 may comprise more or less components than those illustrated, or a combination of certain components, or have different component arrangements.

The RF circuit 110 is configured to receive and transmit electromagnetic waves and realize mutual conversion between electromagnetic waves and electrical signals, so as to communicate with a communication network or some other devices. The RF circuit 110 may comprise various circuit components for performing these functions in the related art, such as an antenna, a radio frequency transceiver, a digital signal processor, an encryption/decryption chip, a subscriber identity module (SIM) card, a memory, and the like. The RF circuit 110 can communicate with various networks, such as the Internet, an intranet, a wireless network, or communicate with other devices through a wireless network. The above wireless network may comprise a cellular telephone network, a wireless local area network or a metropolitan area network. The above wireless network may use various communication standards, protocols and technologies, including but not limited to GSM (Global System for Mobile Communication), EDGE (Enhanced Data GSM Environment), WCDMA (Wideband Code Division Multiple Access), CDMA (Code Division Access), TDMA (Time Division Multiple Access), Wi-Fi (Wireless Fidelity, such as IEEE 802.11a, IEEE 802.11b, IEEE 802.11g and IEEE 802.11n), VoIP (Voice over Internet Protocol), Wi-Max (Worldwide Interoperability for Microwave Access), other protocols for mail, instant messaging and short messages, and any other suitable communication protocols, even including protocols that haven't been developed currently.

The memory 120 is used for storing software instructions and modules relating to a multi-dimensional segmentation method for a 5G protocol stack and a multi-dimensional segmentation device for a protocol stack for implementing the multi-dimensional segmentation method for the 5G protocol stack as provided in the above embodiments. The processor 180 executes the software instructions and modules stored in the memory 120 to perform various functions and process data, so as to realize the functions relating to multi-dimensional segmentation for a 5G protocol stack. The memory 120 may include a high speed random memory and a non-volatile memory, e.g. one or more magnetic storage devices, a flash memory, or other non-volatile memory. In some embodiments, the memory 120 further includes a memory corresponding to the processor 180 but remotely configured. The remotely-configured memory can connect to the terminal 1200 over a network that includes but is not limited to Internet, Intranet, Local area network, mobile communication network and a combination thereof.

The input unit 130 may be configured to receive input digit or character information, and generate a keyboard, mouse, joystick, optical, or track ball signal input related to the user setting and the function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on the touch-sensitive surface 131 or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control button or a switch key), a track ball, a mouse, and a joystick.

The display unit 140 may be configured to display information input by the user or information provided for the user, and various graphical user interfaces of the terminal 900. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 6, the touch-sensitive surface 131 and the display panel 141 are used as two separate components to implement input and output functions, in some embodiments, the touch-sensitive surface 131 and the display panel 141 may be integrated to implement the input function and output functions.

The terminal 1200 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 900 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1200, are not further described herein.

The audio circuit 160, a loudspeaker 161, and a microphone 162 may provide an audio interface between the user and the terminal 1200. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170, the user to receive and send e-mails, browse a webpage, access streaming media, and so on, which provides wireless broadband Internet access for the user. Although FIG. 6 shows the transmission module 170, it may be understood that the transmission module 170 is not a necessary component of the terminal 1200, and when required, the transmission module 170 may be omitted as long as the scope of the essence of this application is not changed.

The processor 180 is the control center of the terminal 1200, and is connected to various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the terminal. Optionally, the processor 180 may include the one or more processing cores. Preferably, the processor 180 may integrate an application processor and a modem. The application processor mainly processes an operating system, a user interface, an application program, and the like. The modem mainly processes wireless communication. It may be understood that the foregoing modem may not be integrated into the processor 180.

The terminal 1200 further includes the power supply 190 (such as a battery) for supplying power to the components. Preferably, the power supply may be logically connected to the processor 180 by using a power management system, thereby implementing functions, such as charging, discharging, and power consumption management, by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 1200 may further include a camera, a Bluetooth module, and the like, which are not described herein again. Specifically, in this embodiment, the display unit of the terminal 1200 is a touch screen display, and the terminal 1200 further includes a memory and one or more programs. The one or more programs are stored in the memory and configured to be executed by the one or more processors. The one or more programs include instructions for performing the following operations:

segmenting a MAC layer in a protocol stack, and placing a physical layer and an HARQ entity of the MAC layer into a predetermined physical resource for processing; and     moving part of modules of the physical layer that are related to an FPGA for processing based on a calculation amount and a functional requirement.

In some embodiments, the operation of segmenting the MAC layer in the protocol stack, and placing the physical layer and the HARQ entity of the MAC layer into the predetermined physical resource for processing further comprises:

segmenting the MAC layer in the protocol stack to separate the HARQ entity of the MAC layer; and     implementing the HARQ entity of the MAC layer that is separated and the physical layer in a carrier module entity, placing the physical layer and the HARQ entity of the MAC layer together into the predetermined physical resource for processing.

In some embodiments, an interface of the segmented MAC layer is a G-bit Ethernet port.

In some embodiments, the carrier module entity comprises a GPP board and a radio frequency board, the radio frequency board integrates the FPGA, an interface between the radio frequency board and the GPP board is a PCIe interface or an SRIO interface.

In some embodiments, the operation of moving part of the modules of the physical layer that are related to the FPGA for processing based on the calculation amount and the functional requirement comprises:

moving part of the modules in the physical layer that have a calculation amount greater than a predetermined value to the radio frequency board with the FPGA.

In some embodiments, the part of the modules that have the calculation amount greater than the predetermined value comprises an FFT module/IFFT module and an addition and subtraction cyclic prefix module in the GPP board.

In some embodiments, the operation of moving part of the modules of the physical layer that are related to the FPGA for processing based on the calculation amount and the functional requirement comprises:

moving modules for performing precoding of a data channel in the physical layer to the radio frequency board with the FPGA.

In some embodiments, the operation of moving part of the modules of the physical layer that are related to the FPGA for processing based on the calculation amount and the functional requirement comprises:

moving modules related to FFT and Turbe codec to the FPGA for processing.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A terminal comprising a processor and a memory storing a plurality of instructions and data, the processor executing the plurality of instructions to perform steps of:
    segmenting a MAC layer in a protocol stack, and placing a physical layer and an HARQ entity of the MAC layer into a predetermined physical resource for processing; and
    moving part of modules of the physical layer that are related to an FPGA for processing based on a calculation amount and a functional requirement.

2. The terminal as claimed in claim 1, wherein the step of segmenting the MAC layer in the protocol stack, and placing the physical layer and the HARQ entity of the MAC layer into the predetermined physical resource for processing further comprises:
    segmenting the MAC layer in the protocol stack to separate the HARQ entity of the MAC layer; and
    implementing the HARQ entity of the MAC layer that is separated and the physical layer in a carrier module entity, placing the physical layer and the HARQ entity of the MAC layer together into the predetermined physical resource for processing.

3. The terminal as claimed in claim 1, wherein an interface of the segmented MAC layer is a G-bit Ethernet port.

4. The terminal as claimed in claim 2, wherein the carrier module entity comprises a GPP board and a radio frequency board, the radio frequency board integrates the FPGA, an interface between the radio frequency board and the GPP board is a PCIe interface or an SRIO interface.

5. The terminal as claimed in claim 4, wherein the step of moving part of the modules of the physical layer that are related to the FPGA for processing based on the calculation amount and the functional requirement comprises:
    moving part of the modules in the physical layer that have a calculation amount greater than a predetermined value to the radio frequency board with the FPGA.

6. The terminal as claimed in claim 5, wherein the part of the modules that have the calculation amount greater than the predetermined value comprises an FFT module/IFFT module and an addition and subtraction cyclic prefix module in the GPP board.

7. The terminal as claimed in claim 4, wherein the step of moving part of the modules of the physical layer that are related to the FPGA for processing based on the calculation amount and the functional requirement comprises:
    moving modules for performing precoding of a data channel in the physical layer to the radio frequency board with the FPGA.

8. The terminal as claimed in claim 1, wherein the step of moving part of the modules of the physical layer that are related to the FPGA for processing based on the calculation amount and the functional requirement comprises:
    moving modules related to FFT and Turbe codec to the FPGA for processing.

9. A multi-dimensional segmentation method for a 5G protocol stack comprising:
    segmenting a MAC layer in a protocol stack, and placing a physical layer and an HARQ entity of the MAC layer into a predetermined physical resource for processing; and
    moving part of modules of the physical layer that are related to an FPGA for processing based on a calculation amount and a functional requirement.

10. The multi-dimensional segmentation method for the 5G protocol stack as claimed in claim 9, wherein the step of segmenting the MAC layer in the protocol stack, and placing the physical layer and the HARQ entity of the MAC layer into the predetermined physical resource for processing further comprises:
    segmenting the MAC layer in the protocol stack to separate the HARQ entity of the MAC layer; and
    implementing the HARQ entity of the MAC layer that is separated and the physical layer in a carrier module entity, placing the physical layer and the HARQ entity of the MAC layer together into the predetermined physical resource for processing.

11. The multi-dimensional segmentation method for the 5G protocol stack as claimed in claim 9, wherein an interface of the segmented MAC layer is a G-bit Ethernet port.

12. The multi-dimensional segmentation method for the 5G protocol stack as claimed in claim 10, wherein the carrier module entity comprises a GPP board and a radio frequency board, the radio frequency board integrates the FPGA, an interface between the radio frequency board and the GPP board is a PCIe interface or an SRIO interface.

13. The multi-dimensional segmentation method for the 5G protocol stack as claimed in claim 12, wherein the step of moving part of the modules of the physical layer that are related to the FPGA for processing based on the calculation amount and the functional requirement comprises:
    moving part of the modules in the physical layer that have a calculation amount greater than a predetermined value to the radio frequency board with the FPGA.

14. The multi-dimensional segmentation method for the 5G protocol stack as claimed in claim 13, wherein the part of the modules that have the calculation amount greater than the predetermined value comprises an FFT module/IFFT module and an addition and subtraction cyclic prefix module in the GPP board.

15. The multi-dimensional segmentation method for the 5G protocol stack as claimed in claim 12, wherein the step of moving part of the modules of the physical layer that are related to the FPGA for processing based on the calculation amount and the functional requirement comprises:

moving modules for performing precoding of a data channel in the physical layer to the radio frequency board with the FPGA.

16. The multi-dimensional segmentation method for the 5G protocol stack as claimed in claim 9, wherein the step of moving part of the modules of the physical layer that are related to the FPGA for processing based on the calculation amount and the functional requirement comprises:

moving modules related to FFT and Turbe codec to the FPGA for processing.

17. A multi-dimensional segmentation device, comprising:

one or more processors;
a memory; and
one or more applications, wherein the one or more applications are stored in the memory, and are configured to be executed by the one or more processors, the one or more applications comprise:
a segmentation module and a moving module;
the segmentation module segmenting an MAC layer in a protocol stack, and placing a physical layer and an HARQ entity of the MAC layer together into a predetermined physical resource for processing; the moving module moving part of the modules of the physical layer that are related to an FPGA for processing based on a calculation amount and a functional requirement.

18. The multi-dimensional segmentation device as claimed in claim 17, wherein the segmentation module is configured to segment the MAC layer in the protocol stack to separate the HARQ entity of the MAC layer, implement the HARQ entity of the MAC layer that is separated and the physical layer in a carrier module entity, place the physical layer and the HARQ entity of the MAC layer together into the predetermined physical resource for processing.

19. The multi-dimensional segmentation device as claimed in claim 17, wherein the moving module is configured to move part of the modules in the physical layer that have a calculation amount greater than a predetermined value to the radio frequency board with the FPGA.

20. The device as claimed in claim 17, wherein the moving module is configured to move the modules for performing precoding of a data channel in the physical layer to the radio frequency board with the FPGA.

* * * * *